United States Patent [19]

Sather

[11] 3,816,733

[45] June 11, 1974

[54] BIT SERIAL DIVIDER WITH FULL SCALE CAPABILITIES

[75] Inventor: Delaine C. Sather, Cedar Rapids, Iowa

[73] Assignee: Collins Radio Company, Dallas, Tex.

[22] Filed: May 9, 1973

[21] Appl. No.: 358,574

[52] U.S. Cl. .................... 235/164
[51] Int. Cl. .................... G06f 7/54
[58] Field of Search .................... 235/164

[56] References Cited

UNITED STATES PATENTS

| | | | |
|---|---|---|---|
| 3,378,677 | 4/1968 | Waldecker et al. | 235/164 |
| 3,492,468 | 1/1970 | Frye | 235/164 |
| 3,700,874 | 10/1972 | Heightley | 235/164 |

*Primary Examiner*—Charles E. Atkinson
*Assistant Examiner*—David H. Malzahn

[57] ABSTRACT

A circuit using standardized components and providing a given word length quotient from the same length dividend and divisor. The circuit checks the input dividend and divisor for polarity and uses logic circuitry to determine if the quotient would be an improper fraction of either polarity. If an improper fraction did result, a given limit output of one polarity or the other is provided. Otherwise, the circuit operates in a normal long division process of examining the magnitude of each partial remainder in the division process, subtracting if the remainder is larger than the divisor, inserting a digit in the quotient upon each subtraction and increasing the value of the remainder for the next examination. The circuit operates with serial bit digit word format with the least significant bit of the digit word being supplied first both to and from the circuit.

7 Claims, 14 Drawing Figures

```
Y = +72/128      01001000
X = +77/128      01001101

Y/X = +119/128  |01110111|
   01001000
   00000000
   010010000
    10110011
    010000110
     10110011
     001110010
      10110011
      001001010
       00000000
       010010100
        10110011
        010001110
         10110011
         010000010
          10110011
          00110101
```

FIG. 7a

```
Y = -72/128      10111000
X = +77/128      01001101

Y/X = -120/128  |10001000|
   10111000
   01001101
   000001010
    00000000
    000010100
     00000000
     000101000
      00000000
      001010000
       10110011
       000000110
        00000000
        000001100
         00000000
         000011000
          00000000
          00011000
```

FIG. 7b

```
Y = +72/128      01001000
X = -77/128      10110011

Y/X = -120/128  |10001000|
   01001000
   10110011
   111110110
    00000000
    111101100
     00000000
     111011000
      00000000
      110110000
       01001101
       111111010
        00000000
        111110100
         00000000
         111101000
          00000000
          11101000
```

FIG. 7c

```
Y = -72/128      10111000
X = -77/128      10110011

Y/X = +119/128  |01110111|
   10111000
   00000000
   101110000
    01001101
    101111010
     01001101
     110001110
      01001101
      110110110
       00000000
       101101100
        01001101
        101110010
         01001101
         101111110
          01001101
          11001011
```

FIG. 7d

| | $N_0$ | $N_1$ | $N_2$ | $N_3$ | $N_4$ | $N_5$ | $N_6$ | $N_7$ | $N_0$ |
|---|---|---|---|---|---|---|---|---|---|
| X | 10110010 | 10110010 | 10110010 | 10110010 | 10110010 | 10110010 | 10110010 | 10110010 | |
| IN | 00010010 | 00001001 | 01100001 | 01001110 | 01010010 | 00101001 | 01110001 | 01000001 | |
| IN-X | 11011111 | 11000010 | 10011100 | 10100100 | 10111111 | 11100010 | 10000010 | 10101100 | |
| ±X | | 00000000 | 11001101 | 11001101 | 11001101 | 00000000 | 11001101 | 11001101 | 11001101 |
| OUT | | 00010010 | 00001001 | 01100001 | 01001110 | 01010010 | 00101001 | 01110001 | 01000001 |
| OUT±X | | 00010010 | 11000010 | 10011100 | 10100100 | 01010010 | 11100010 | 10000010 | 10101100 |
| IN' | 0 | 00010010 | 11000010 | 10011100 | 10100100 | 01010010 | 11100010 | 10000010 | 1010110 |
| $\overline{83}$ | | 00000000 | 10000000 | 10000000 | 10000000 | 00000000 | 10000000 | 10000000 | 10000000 |
| Y/X | | 00000000 | 10000000 | 11000000 | 11100000 | 01110000 | 10111000 | 11011100 | 11101110 |
| IN | 00011101 | 01010000 | 00101000 | 00010100 | 00001010 | 01100000 | 00110000 | 00011000 | |
| IN-X | 11010110 | 10111101 | 11100011 | 11011011 | 11000000 | 10011101 | 11111101 | 11010111 | |
| ±X | | 10110010 | 00000000 | 00000000 | 00000000 | 11001101 | 00000000 | 00000000 | 00000000 |
| OUT | | 00011101 | 01010000 | 00101000 | 00010100 | 00001010 | 01100000 | 00110000 | 00011000 |
| OUT±X | | 10100000 | 01010000 | 00101000 | 00010100 | 11000000 | 01100000 | 00110000 | 00011000 |
| IN' | 0 | 10100000 | 01010000 | 00101000 | 00010100 | 11000000 | 01100000 | 00110000 | 0001100 |
| $\overline{83}$ | | 10000000 | 00000000 | 00000000 | 00000000 | 10000000 | 00000000 | 00000000 | 00000000 |
| Y/X | | 10000000 | 01000000 | 00100000 | 00010000 | 10001000 | 01000100 | 00100010 | 00010001 |
| SB | 00000001 | 00000001 | 00000001 | 00000001 | 00000001 | 00000001 | 00000001 | 00000001 | 00000001 |

FIG. 8a

| | N0 | N1 | N2 | N3 | N4 | N5 | N6 | N7 | N0 |
|---|---|---|---|---|---|---|---|---|---|
| X | 11001101 | 11001101 | 11001101 | 11001101 | 11001101 | 11001101 | 11001101 | 11001101 | |
| IN | 00010010 | 01101111 | 00110111 | 00011011 | 00001101 | 01011111 | 00101111 | 00010111 | |
| IN -X | 10101001 | 11000010 | 10011100 | 10100100 | 10111111 | 11100010 | 10000010 | 10101100 | |
| ±X | | 11001101 | 00000000 | 00000000 | 00000000 | 10110010 | 00000000 | 00000000 | 00000000 |
| OUT | | 00010010 | 01101111 | 00110111 | 00011011 | 00001101 | 01011111 | 00101111 | 00010111 |
| OUT±X | | 11011111 | 01101111 | 00110111 | 00011011 | 10111111 | 01011111 | 00101111 | 00010111 |
| IN' | 0 | 11011110 | 01101110 | 00110110 | 00011010 | 10111110 | 01011110 | 00101110 | 0001011 |
| $\overline{83}$ | | 10000000 | 00000000 | 00000000 | 00000000 | 10000000 | 00000000 | 00000000 | 00000000 |
| Y/X | | 10000000 | 01000000 | 00100000 | 00010000 | 10001000 | 01000100 | 00100010 | 00010001 |
| IN | 00011101 | 00001110 | 01011110 | 01110001 | 01101101 | 00110110 | 01001110 | 01111110 | |
| IN-X | 10100000 | 10111101 | 11100011 | 11011011 | 11000000 | 10011101 | 11111101 | 11010011 | |
| ±X | | 00000000 | 10110010 | 10110010 | 10110010 | 00000000 | 10110010 | 10110010 | 10110010 |
| OUT | | 00011101 | 00001110 | 01011110 | 01110001 | 01101101 | 00110110 | 01001110 | 01111110 |
| OUT±X | | 00011101 | 10111101 | 11100011 | 11011011 | 01101101 | 10011101 | 11111101 | 11010011 |
| IN' | 0 | 00011100 | 10111100 | 11100010 | 11011010 | 01101100 | 10011100 | 11111100 | 1101001 |
| $\overline{83}$ | | 00000000 | 10000000 | 10000000 | 10000000 | 00000000 | 10000000 | 10000000 | 10000000 |
| Y/X | | 00000000 | 10000000 | 11000000 | 11100000 | 01110000 | 10111000 | 11011100 | 11101110 |
| SB | 00000001 | 00000001 | 00000001 | 00000001 | 00000001 | 00000001 | 00000001 | 00000001 | 00000001 |

FIG. 8b

| WORD TIME | IN | IN-X | OUT | ± X | OUT ±X | Y/X | |
|---|---|---|---|---|---|---|---|
| NO | -72/128 | | | | | | |
| N1 | +10/128 | -67/128 | -72/128 | +77/128 | +5/128 | 10000000 | -128/128 |
| N2 | +20/128 | -57/128 | +10/128 | 0 | +10/128 | 01000000 | -128/128 |
| N3 | +40/128 | -37/128 | +20/128 | 0 | +20/128 | 00100000 | -128/128 |
| N4 | +80/128 | +3/128 | +40/128 | 0 | +40/128 | 00010000 | -128/128 |
| N5 | +6/128 | -71/128 | +80/128 | -77/128 | +3/128 | 10001000 | -120/128 |
| N6 | +12/128 | -65/128 | +6/128 | 0 | +6/128 | 01000100 | -120/128 |
| N7 | +24/128 | -53/128 | +12/128 | 0 | +12/128 | 00100010 | -120/128 |
| NO | | | +24/128 | 0 | +24/128 | 00010001 | -120/128 |

FIG. 9

| WORD TIME | IN | IN-X | OUT | ± X | OUT ±X | Y/X | |
|---|---|---|---|---|---|---|---|
| NO | +72/128 | | | | | | |
| N1 | +144/128 | +67/128 | +72/128 | 0 | +72/128 | 00000000 | 0 |
| N2 | +134/128 | +57/128 | +144/128 | +77/128 | +67/128 | 10000000 | +64/128 |
| N3 | +114/128 | +37/128 | +134/128 | +77/128 | +57/128 | 11000000 | +96/128 |
| N4 | +74/128 | -3/128 | +114/128 | +77/128 | +37/128 | 11100000 | +112/128 |
| N5 | +148/128 | +71/128 | +74/128 | 0 | +74/128 | 01110000 | +112/128 |
| N6 | +142/128 | +65/128 | +148/128 | +77/128 | +71/128 | 10111000 | +116/128 |
| N7 | +130/128 | +53/128 | +142/128 | +77/128 | +65/128 | 11011100 | +118/128 |
| NO | | | +130/128 | +77/128 | +53/128 | 11101110 | +119/128 |

FIG. 10

BIT SERIAL DIVIDER WITH FULL SCALE CAPABILITIES

THE INVENTION

The present invention is concerned generally with electronics and more specifically with digital logic wherein it is desired to divide one digital word representing a dividend by another digital word representing a divisor.

While the prior art contains many forms of dividing circuits, it is believed that the present circuit is unique in its design and additionally utilizes standardized components which simplify building of the circuit and further allows the use of the various components in plug-in connector circuitry apparatus whereby the same components can be used to construct various types of mathematical circuits. Other types of circuits are incorporated in various other applications of mine such as a basic integration circuit for utilization in various configurations and found in application Ser. No. 225,443 filed Feb. 11, 1972 now U.S. Pat. No. 3,757,261 and a further application pertaining to multiplication of digital words as found in Ser. No. 238,905 filed Mar. 28, 1972 now U.S. Pat. No. 3,761,699. I hereby specifically wish to incorporate the material in these reference applications in the present application for completeness of disclosure. The first referenced application utilizes an integration process for approximating answers in division and multiplication while the second referenced application uses straight digital techniques much the same as is found in the present inventive concept except that the present concept is for dividing rather than multiplying.

It is, therefore, an object of the present invention to provide an improved digital word divider.

Further objects and advantages of the present invention may be ascertained from a reading of the specification and appended claims in conjunction with the drawings wherein:

FIG. 1 is an overall schematic of one embodiment of the invention;

FIG. 2 illustrates the quotient sign detection circuit portion of FIG. 1;

FIG. 3 illustrates the negative limit detection circuit portion of FIG. 1;

FIG. 4 illustrates the negative limit quotient correcting circuit portion of FIG. 1;

FIG. 5 illustrates the subtraction detection circuit of FIG. 1;

FIG. 6 illustrates the positive limit detection circuit portion of FIG. 1;

FIGS. 7*a* to 7*d* illustrate four division probems in the more conventional manner of digitally dividing;

FIGS. 8*a* and 8*b* illustrate graphically the digital words found at various points within the circuit of FIG. 1 as a running process in time from the first word in a division process to the last word which completes the division process and supplies the output quotient; and FIGS. 9 and 10 are supplementary tables used to clarify the division of the problems of FIGS. 7*b* and 7*a*.

Figure 1:
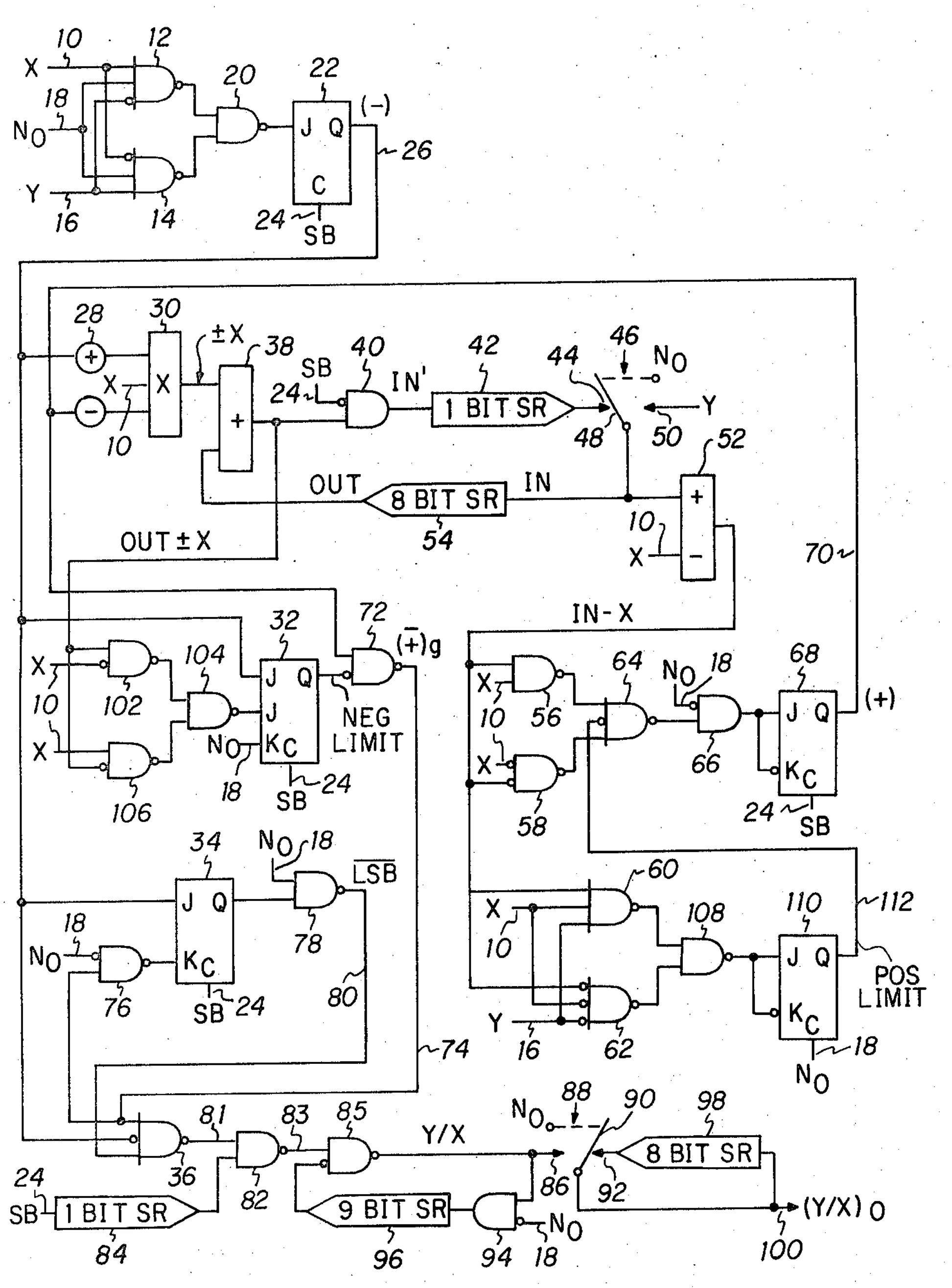
In FIG. 1 an input terminal 10 labeled X supplies an input to a first NAND gate 12 and to a second NAND gate 14. A further input 16 labeled Y is also supplied to the two NAND gates 12 and 14. However, the input 10 is inverted before being applied to NAND gate 14 and the input 16 is inverted before being applied to NAND gate 12. An input 18 labeled $N_o$ is also applied to each of the NAND gates 12 and 14. The outputs of the NAND gates 12 and 14 are supplied to the input of a NAND gate 20 whose output is supplied to a J input of a J-K flip-flop 22. A clock input of flip-flop 22 is supplied by a sync bit source 24. A Q or true output 26 of J–K flip-flop 22 is supplied to various points such as a positive terminal or control input 28 of a multiplier 30, a J input of a J–K flip-flop 32, a J input of a J–K flip-flop 34 and is inverted and applied to an input of a NAND gate 36. The number 10 input X is also supplied to a multiplying input to multiplier 30 and an output of multiplier 30 is supplied as one input to a summing circuit or adding circuit 38. An output of summing circuit 38 is supplied to an input of AND gate 40 which receives an inverted version of the synchronization bit 24. An output of AND gate 40 is supplied to the input of a 1 bit shift register 42. An output of 1 bit shift register 42 is supplied to a contact 44 of a switch generally designated as 46 having a movable contact 48 and another stationary contact 50 receiving input Y. The switch 46 is operated during the entire word time $N_o$. This is the signal which is supplied on lead 18, so that the movable contact 48, which is normally contacting contact 44 is moved to contact 50. Movable contact 48 is supplied to a positive input of a subtracting circuit or summing circuit 52 and also to an input of an 8 bit shift register 54. An output of 8 bit shift register 54 is supplied to a second input of summing circuit 38. Summing circuit 52 also has an X input 10 supplied to a negative input thereof. An output of summing circuit 52 is supplied as an input to a first NAND gate 56, inverted and applied to a second NAND gate 58, supplied to a NAND gate 60 and inverted and supplied to a further NAND gate 62. NAND gate 56 also receives the X input 10 and its output is connected to an input of a further NAND gate 64. The X input 10 is inverted and applied to NAND gate 58 and the output thereof is supplied as a further input to NAND gate 64. An output of NAND gate 64 is supplied to an input of an AND gate 66 which receives as a second input an inverted version of $N_o$ input 18. An output of AND gate 66 is supplied to a J input of a J-K flip-flop 68 and is inverted and also applied to the K input of J-K flip-flop 68. Flip-flop 68 receives at a clock input thereof the synchronization bit 24. A true or Q output of flip-flop 68 is supplied on a lead 70 to a negative or control input of multiplier 30 as well as being supplied to an input of a NAND gate 72. NAND gate 72 also receives an inverted version of the Q output of J-K flip-flop 32 and has its output supplied on a lead 74 to a second input of NAND gate 36 as well as being supplied to an input of a NAND gate 76.

The NAND gate 76 receives an inverted version of the $N_o$ input 18 and supplies its output to a K input of J-K flip-flop 34. J-K flip-flop 34 receives a sync bit 24 at its clock input. A Q or true output of flip-flop 34 is supplied to an input of a NAND gate 78 having a second input from $N_o$ input 18. An output of NAND gate 78 is supplied on a lead 80 to a final input of NAND gate 36. An output of NAND gate 36 is supplied via a lead 81 to an input of a NAND gate 82. The sync bit 24 is supplied through a one bit shift register 84 to a second input of NAND gate 82. The output of NAND gate 82 is supplied via a lead 83 to an input of a NAND gate 85 whose output is the answer or quotient of Y divided by X and which is supplied to a contact 86 of a switch generally designated as 88 having a movable contact 90 and a second terminal 92. The output of NAND gate 85 is also supplied to an input of an AND gate 94 having an inverted input of $N_o$ lead 18. An output of AND gate 94 is supplied through a nine bit shift register 96 to an inverted second input of NAND gate 85. The switch 88 is moved upon application of the signal during word time $N_o$ from its normal position at contact 92 to contact 86. An eight bit shift register 98 has its output connected to terminal 92 and its input connected to an apparatus output 100 which is labeled $(Y/X)_o$. This label indicates that it is the output quotient.

The output of summing circuit 38 is also supplied as an input to a NAND gate 102 which receives as a second input an inverted version of X input 10 and whose output is supplied to a NAND gate 104. The output signal from summing circuit 38 is also inverted and supplied to a NAND gate 106, which also receives an input X from lead 10. The output of NAND gate 106 is also supplied to NAND gate 104 and the output thereof is supplied to a second J input of flip-flop 32. Flip-flop 32 at its K input has the $N_o$ lead 18 and at its clock input has the sync bit lead 24. An output of flip-flop 32 is inverted and supplied to NAND gate 72.

The outputs of the two NAND gates 60 and 62 are supplied to inputs of a NAND gate 108 and an output thereof is supplied to the J input of a J-K flip-flop 110 and is inverted and supplied to a K input of the same flip-flop. Flip-flop 110 has its clock input supplied by $N_o$ lead 18.

FIGS. 2–6 incorporate the same designations as does FIG. 1 since they are merely used to explain various portions of FIG. 1 and its operation.

FIG. *7a* illustrates a mathematical problem in the format used in ordinary long division with decimal numbers. This same problem is illustrated in the top half of FIG. 8*a*, showing a binary word-by-binary word change at various points within the circuit of FIG. 1. FIG. 10 presents much of the information of the top half of FIG. 8*a* using decimal oriented fractions for ease of interpreting the information in FIG. 8*a*. FIG. *7b* is presented in the same format as FIG. *7a* with the difference that the dividend is negative in FIG. 7b rather than positive as in FIG. *7a*. The lower half of FIG. *8a* and FIG. 9 corresponds to FIG. *7b* in the same manner as the top half of FIG. *8a* and FIG. 10 corresponds to FIG. *7a*.

FIG. *7c* and *7d* are again further division problems illustrated in the same manner as FIG. *7a* and further expanded in FIG. *8b*. However, it is believed unnecessary to provide the additional detail for these problems as provided in conjunction with FIGS. *7a* and *7b*.

OPERATION

The serial word divider includes two serial word inputs Y and X and a serial word output $(Y/X)_o$. Each of these serial words comprises an equal number of bits and utilizes a two's complement code with the least significant bit first and the sign bit last. In the present embodiment each of these serial words is eight bits in length, although other word lengths may be used. The quotient or answer to the division problem also includes only eight bits so that the apparatus can be used with other math functions using the basic inventive concept. All the words operate in synchronism by means of a syn bit (SB) from the clock which is generated once each word time and operates J-K flip-flops on the falling edge of the SB such that the outputs of the FF's change at the beginning of the next word.

One division operation requires one complete frame where a frame is defined as a number of word times equal to the number of bits in the Y word.

The start of each new frame (and the end of the preceding frame) is commenced or synchronized by means of a synchronization word ($N_o$) from the clock which is generated for one full word time each frame.

In order to describe the serial word divider, an eight bit example is utilized. Fractional binary notation will be utilized such that when the sign bit (eighth or last bit of the word) appears as a logic 1, it indicates a weighted value of $-128/128$ or in other words $-1.0$. All the other bits (1 through 7 or first through next to last) of the words have positive weighted values (+1/128, +2/128, +4/128, . . . +64/128). The sign bit of the serial word is always in synchronism with the sync bit.

Answers or quotients to the problem Y divided by X are determined MSB (Most Significant Bit) first. However, the generated word is rearranged during computation so that it is outputted least significant bit (LSB) first. The most significant bit is determined at word time $N_o$ by sensing the sign of the Y and X words. If the signs of Y and X are not the same, a logic 1 is supplied on lead 26 from J-K flip-flop 22 for the entire word time $N_1$. This word is the first word of the frame commencing with $N_1$ and ending with $N_o$ for the output word. The lead 26 returns to a logic 0 for word times $N_2$ through $N_o$ due to the reset input SB on lead 24 and the lack of input $N_o$ to 12 and 14 until the next frame.

The application of a logic 1 on lead 26 actuates the multiplier 30 so that its output as supplied to summing circuit 38 and designated as $\pm$X results in the addition of X during the time that a logic 1 appears on lead 26. This can be ascertained from noting the $\pm$X portion of FIG. 8 in the $N_1$ column and also from observing the $\pm$X column in FIGS. 9 and 10 on line $N_1$. This may be possibly put in better perspective by viewing FIGS. 7 wherein line 5 of each of the portions of FIG. 7 is either a 0 where X and Y are both of the same sign or is the same value as the X number where the signs of X and Y are different. The designation as to a particular line in FIG. 7 is referring to the total number of lines from the top of the Figure rather than from the commencement of the problem. In other words, the line commencing Y/X = will be considered the third line in this and further discussions.

Quotient Sign Detection Circuit

FIG. 2

Figure 2:
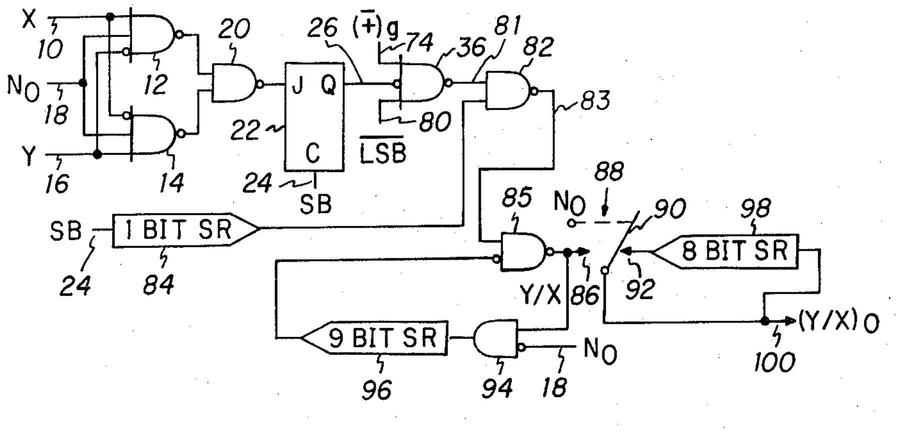

The appearance of a logic 1 on line 26 of FIG. 2 is inverted to appear as a logic 0 during the word time $N_1$ to the NAND gate 36. This causes the appearance of a logic 1 at the output of NAND gate 36 which combines with the delayed synchronization bit at the least significant bit time to produce a logic 0 output from gate 82. This is shown inverted in FIG. 8 in the line designated $\overline{\mathbf{83}}$. The logic 0 output forces the most significant bit (at the time it is outputted it is in the least significant bit position) at the output of NAND gate 85 to be a logic 1 thereby being representative of a negative number. As mentioned above, the nine bit shift register 96 turns the word around in the next seven words and thereby places this logic 1 in the most significant or sign bit position by the time it is outputted to the eight bit shift register 98.

In other words, the logic 1 appears on lead 86 during word $N_1$ in the least significant bit position (+1/128) through the use of a sync bit as delayed one bit period in shift register 84. Because of the circulating nine bit shift register 96, this appears as the next least significant bit (+2/128) at lead 86 at word time $N_2$, . . . , next to most significant (+64/128) at terminal 86 at word time $N_7$ and most significant bit (−128/128) at terminal 86 at word time $N_0$. Thus, the nine bit shift register 96 serves to reverse the order of bits from the most significant bit first to most significant bit last.

At word time $N_0$ the switch 88 is operated to transfer the word from shift register 96 into shift register 98 and the application of a logic 1 as inverted to AND gate 94 clears shift register 96 to contain all all logic 0's.

Figure 3:
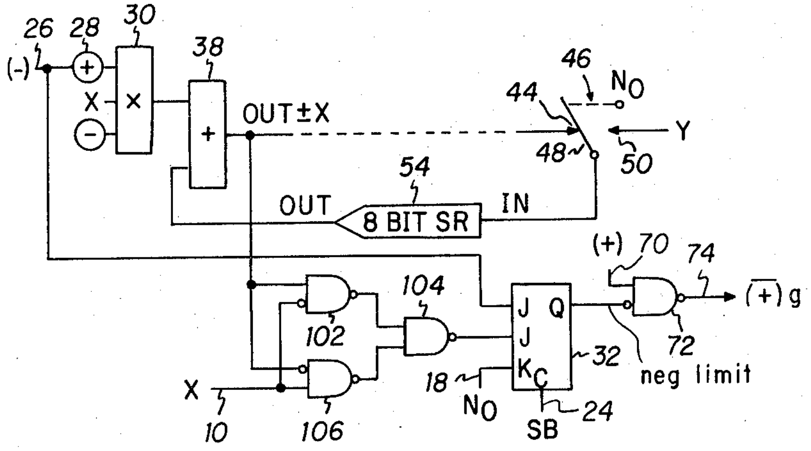

Negative Limit Detection Circuit
FIG. 3

Advancing to FIG. 3, it will be noted that the negative lead 26 at word time $N_1$ also feeds the positive input terminal 28 of multiplier 30 and one of the J inputs of J-K flip-flops 32.

It should be noted that multiplier 30 is only enabled by lead 26 when the divisor and dividend have different signs. It may be ascertained from a reading of my above referenced applications that a mulitplier circuit such as 30 will provide an output only when there is a logic 1 appearing at one of the positive or negative terminals since an absence of a logic 1 at either of these terminals effectively provides an X times 0 output at the lead going to the summing circuit 38.

At word time $N_0$ the switch 46 is operated and the input dividend Y is inserted into an eight bit shift register 54 via terminal 50 and movable contact 48. During word time $N_1$ the signal appearing at the output of shift register 54 and thus being applied to the other input of the summing circuit 38 equals the previously submitted word Y as delayed in shift register 54. The output of summing circuit 38 at time $N_1$ is thus the sum of Y plus X as long as their signs are different whereby multiplying circuit 30 is activated. The logic circuitry 102, 104, 106, 32 and 72 is used to determine if the quotient will be a proper or an improper fraction as follows:

| | | |
|---|---|---|
| If Y is (+)<br>and, X is (−)<br>and, Y + X is (+) | or | if Y is (−)<br>and, X is (+)<br>and, Y + X is (−) |

then, |X| is less than |Y|
and, |Y/X| is greater than 1.0 (more negative than −1.0)

For the above conditions, all (+) word time logic outputs are gated OFF by the application of a logic 0 to NAND gate 72 thereby forcing the output of NAND gate 72 on lead 74 to a logic 1 during word times $N_2$ through $N_0$. Referring back to FIG. 2, this logic 1 on lead 74 in combination with logic 0 on lead 26 and logic 1 on lead 80 forces all further outputs from NAND gate 36 to a logic 0 thereby providing a logic 1 output from NAND gate 82 and preventing further logic 1's from reaching output 86. Thus, the output is limited to a −1.0 or 00000001. Actually, the desired negative limit is −127/128 or 10000001. This desired negative limit is obtained by adding the circuit of FIG. 4 which adds a least significant bit to the output at word time $N_0$ (if no logic 0 bits have previously occurred on lead 74) by changing lead 80 to a logic 0.

Returning, however, to FIG. 3, it will be noted that the output of NAND gate 106 is a logic 0 if X and Y are as described in the first column above and the output of NAND gate 102 will be a logic 0 if X and Y are as described in the second column. However, a logic 0 appearing on either of the leads will provide a logic 1 output from NAND gate 104 to activate the J-K flip-flop 32 in combination with the logic 1 appearing on lead 26 during word $N_1$.

As will be noted, once the lead 74 has become a logic 1 in a given word time, it stays a logic 1 since flip-flop 32 cannot be reset until word time $N_0$ and then only at the end thereof due to the trailing edge of the synchronizing bit on lead 24 in combination with the $N_0$ word at the K input. The logic 1 output as inverted and applied to gate 72 nullifies any effects of signals appearing on lead 70 and thus lead 74 remains at a logic 1.

In summary, therefore, the circuit of FIG. 3 is designed for the purpose of determining when the quotient of Y divided by X will exceed −1 in the negative direction. In other words, when this quotient would be a negative improper fraction. When such a condition is detected, a logic 1 is outputted from NAND gate 72 on lead 74 thereby forcing all remaining bits supplied to the Y/X lead 86 to be a logic 0.

Figure 4:
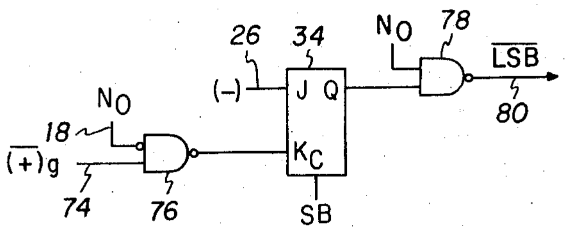

Negative Limit Quotient Correcting Circuit
FIG. 4

FIG. 3 by itself would provide an answer, as mentioned above, with a logic 1 in the sign or MSB bit position and the remaining bits would be logic zeros. This is undesirable since a −1.0 or 00000001 is an unusable serial word input to certain devices with which the present invention is used. Thus, the answer is altered to the negative limit of −127/128 or, in other words, 10000001. This is accomplished by FIG. 4 which inserts a logic 1 in the least significant bit position of any negative quotient during the first bit position of word $N_0$. Therefore, line 80 is normally a logic 1, but it is occasionally changed to a logic zero only for the word time $N_0$ of an improper fraction negative number.

The NAND gate 76 of FIG. 4 receives as one input the signal indicative of word time $N_0$ in its inverted condition and as the other input the signal on lead 74. A logic 0 on either input to NAND gate 76 supplies a logic 1 to the K input of J-K flip-flop 34. Since word time $N_0$ appears during each frame, the J-K flip-flop 34 is normally set to a logic 0 output at Q. It is then initially set by a logic 1 appearing on lead 26 at the first synchronization bit time in word $N_1$ to a logic 1 output at Q.

As indicated, the purpose of FIG. 4 is to provide a least significant bit only in the event that the quotient would be a negative improper fraction. Thus, FIG. 4 should provide a logic 0 output to produce a logic 1 on lead 86 only if the quotient would have been larger than −1. This restriction is accomplished by deactivating the flip-flop 34 whenever there is a logic 0 on lead 74 thereby indicating a logic 1 to appear in the quotient. Such a logic 1 would indicate that the quotient must of necessity be a proper fraction or in other words between 0 and −1.0. A logic 0 appearing on lead 74 will produce a logic 1 output from NAND gate 76 thereby resetting flip-flop 34 to provide a logic 0 output. The logic 0 output from flip-flop 34 will thus prevent a logic 0 output from being provided by NAND gate 78 on lead 80 until flip-flop 34 is reset at the end or SB position of the next $N_o$ word.

Returning momentarily to the formulas used in conjunction with FIG. 3, it will be noted that these formulas take care of the situations when X and Y are of the opposite sign and Y is larger in absolute magnitude than X. The formulas also take care of the situation where X and Y are of the same magnitude if Y is positive and X is negative. However, for the opposite condition, the logic circuitry of FIG. 3 will not actuate the flip-flop 32. Thus, the circuitry of FIG. 3 will only reliably provide an output if the quotient would be greater than −1.

For the special condition of Y and X being of the same magnitude and Y being negative and X being positive, the circuitry of FIG. 4 is added.

Figure 5:
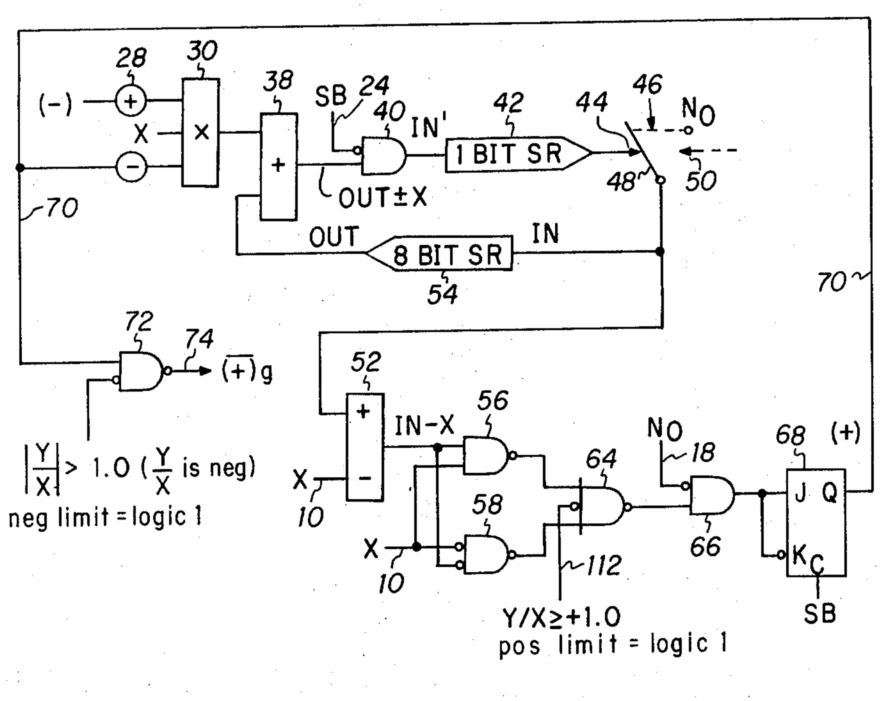

Thus, FIG. 3 is used to assure that logic 0's will be placed in the quotient for all word times from $N_2$ to $N_7$ regardless of what occurs on line 70 from the circuitry of FIG. 5 whenever the quotient would be larger than −1 or equal to −1 with the special condition of Y being positive and X being negative. For the opposite sign conditions of X and Y, the circuitry of FIG. 3 is never activated. This is not important since there will be no activation of line 70 in view of the answer being all logic 0 outputs. However, the circuitry of FIG. 4 is still used to provide a logic 1 in the least significant bit position of the answer whereby any answer which is equal to or exceeds a −1 for the quotient will be limited to −127/128.

A summary of FIG. 4 is thus that the flip-flop 34 is set to provide a logic 1 at the Q output only if there is an indication from flip-flop 22 on lead 26 that the quotient will be a negative number. If the quotient would be an improper fraction or in other words a negative number greater than −1, lead 74 will continuously remain in a logic 1 condition and thus, there will be no input to the K input of flip-flop 34; until word time $N_o$, thus maintaining the Q output at a logic 1 such that there will be a logic 0 output on lead 80 to cause a logic 1 at the output of NAND gate 85 during the first bit position of word $N_o$.

Subtraction Detection Circuit
FIG. 5

Advancing to FIG. 5, it may be ascertained that:

| | | |
|---|---|---|
| if, Y is (+) | or | if, Y is (−) |
| and, X is (−) | | and, X is (+) |
| and, Y + X is (−) | | and, Y + X is (+) |

then, $|X| > |Y|$ and, $|Y/X| > -1.0$ (more positive than −1.0)

From the previous discussion, it is seen that if the quotient will be negative, FIG. 2 operates to insert a logic 1 in the most significant bit position. However, if the quotient will be a positive number, this circuit operates to produce a logic 0 in the most significant bit position. Again, assuming that the quotient will be negative but an improper fraction, FIG. 3 operates to insert all logic 0's in bit positions $N_2$ through $N_o$, except for the logic 1 which FIG. 4 inserts in the least significant bit position at $N_o$. FIG. 5 acts to determine when the partial or tentative remainder is larger than the divisor so that another logic 1 may be inserted in the quotient. As in divisor of decimal numbers, the insertion of any digit other than a 0 in the quotient at any single step in the division process requires the subtraction of a number representative of that digit from the previous partial remainder to obtain a new partial remainder which is compared to the divisor to determine if this new partial remainder is larger or smaller than the divisor and steps taken accordingly. This is the function of FIG. 5.

Reference may be made to FIG. *7a* wherein it will be noted that the divisor and dividend are both positive numbers. Thus, a logic 0 is inserted in the first bit position or most signicant bit position of the quotient. Likewise, all logic 0's are placed in line 5 of FIG. *7a* thereby indicating that nothing is to be added to the dividend Y as shown in line 4. Thus, in adding line 4 to line 5, the sum as shown in line 6 is obtained. As in normal division, a digit is added to the end of the partial remainder to increase its value. This partial remainder may be determined from examination to constitute a number equivalent to the improper fraction 144/128. Since this is larger than the divisor, a logic 1 is thus placed in the next most significant bit position of the final answer. Accordingly, the divisor is subtracted from the previous partial quotient to obtain a new partial quotient. This new partial quotient is shown in line 8 of FIG. *7a* as 134/128. The number in line 7 is the binary complement of the divisor X as shown in line 2 since as known to those skilled in the art the addition of a negative number is simpler in digital logic than is the subtraction of a positive number. Again, the partial quotient in line 8 is larger than the divisor and a second logic 1 is inserted in the third most significant bit position of the final answer. This process continues until as shown in line 12, the partial remainder is smaller than the divisor and thus a logic 0 is inserted into the fifth most significant position of the quotient and thus 0 is subtracted from the partial quotient of line 12 and the new partial quotient on line 14 becomes an improper fraction having a value of 148/128. As may be ascertained, three more logic 1's are provided to the final answer with a remainder on the last line of FIG. *7a* of 53/128.

Referring to FIG. *7b*, it may be ascertained that this problem is operated on in much the same manner as the division problem of FIG. *7a*, except that in this instance the dividend Y is a negative number. Thus, a logic 1 is inserted in the first or most significant bit position of the final answer as shown on line 3 of FIG. *7b* so as to indicate that the answer will be negative. The next step is to add the divisor X to the dividend to produce the summation as shown in line 6 of FIG. *7b*. This step of adding to produce the first remainder of line 6 is unique to numbering systems requiring a digit in the first bit position to show that the number is positive or negative. Thus, this step is not known to most people working only with decimal numbers which merely use the plus or minus to keep track of the polarity designation of quotients. As will be noted, the remainder on line 6 is still only equivalent to the fraction 10/128 and since it is smaller than the divisor, a logic 0 is inserted in the answer. As is noted, the remainder doubles in value on each occurrence until in line 12 the remainder is finally larger than the divisor and at this point a logic 1 is inserted in the fifth most significant bit position of the quotient and the divisor is subtracted to produce a remainder in line 14 of 6/128. As the problem is presented, it is limited to an 8 bit position and thus the remainder never again exceeds the value of the divisor and results in a final remainder of 24/128.

The two different value remainders are the reasons for the slightly different answers as shown of 119/128 and 120/128 for the positive and negative quotients, respectively.

Applying this information to FIG. 5, it will be ascertained that line 70 is placed in a logic 1 condition whenever the word appearing on the IN line 48 is larger than the word X appearing on line 10 and being subtracted therefrom.

This comparison is accomplished by taking the difference between IN and X comparing it to X in NAND gates 56 and 58.

The operation of FIG. 5 after word time $N_0$ proceeds in accordance with the following information. The output of flip-flop 68 is a logic 0 at word time $N_0$ since a logic 1 was gated to the K input of flip-flop 68 at word time $N_0$ through the action of the logic 1 appearing at the input of the inverting input of AND gate 66 to thereby cause a logic 0 at the output which is inverted at the K input of flip-flop 68 to activate flip-flop 68 upon the end of the appearance of a synchronization bit. At word time $N_1$ the minus input applied to terminal 28 of the multiplier 30 is a logic 1 and the signal at the output of summing means 38 and labeled OUT $\pm$ X equals the summation of Y + X. This is shown in the problems illustrated in FIGS. 7*b* and 7*c* as the remainder in line 6 after determining at word time $N_1$ that the answer is negative.

The word appearing at the output of summing means 38 which is labeled (OUT $\pm$ X) has its most significant bit forced to 0 via the AND gate 40 before passing through the one bit shift register 42. This is accomplished by inverting the synchronization bit at the most significant bit time of each word and forcing a logic 0 output from AND gate 40. This action effectively multiplies the value of the word times 2. Thus, the value of the word appearing at terminal 44 is effectively twice the value of the word appearing at the output of summing circuit 38 at each word time. This action was commented upon supra in connection with FIG. 7*b.*

At word time $N_1$ the value of digital word X is subtracted from the word IN as appears at the input of shift register 54. The sign of IN-X is compared in the circuitry appearing at the lower portion of FIG. 5 with the sign of X at word time $N_1$. If (1) IN-X is positive and X is positive or if (2) IN-X is negative and X is negative, then it is apparent that the word IN is larger (a more positive number) than the word X. When IN is larger than the word X, a logic 1 will appear at lead 70 for the entire next word time. (In this case $N_2$, if the problem of FIG. 7*a* is considered.) This will cause a logic 0 to appear at lead 74. The minus limit lead 26 has returned to a logic zero by word time $N_2$ and thus a logic one is introduced into lead 86 which after circulating in the nine bit shift register 96 for six more times will appear in the answer at terminal 100 as a logic 1 in the next to the most significant bit position.

It should be noted that the word appearing at the output of summing means 38 at word time $N_2$ will equal the word appearing at the input of shift register 54 during the previous word time less the divisor signal X when a logic 1 appears on lead 70 for insertion into the quotient. Further, each word time that follows will produce a logic 1 in the next least significant bit of the answer as long as the words (IN-X) and X are of the same sign.

This last statement is further illustrated in the table of FIG. 9 as applied to the problem appearing in FIG. 7*b*. The table of FIG. 9 provides the fractional equivalents of the words for illustrative purposes. The digital equivalent may be found in the lower portion of FIG. 8*a* which supplies most of the same information in digital word format.

A comparison of FIG. 9 and the division problem of FIG. 7*b* may help clarify the action of FIG. 5. FIG. 9 provides, in the column labeled IN, the values of the words appearing on lead 48 and applied to the plus input of summing circuit 52 during each of the word times. This word would correspond to those even numbered lines in FIG. 7*b* starting with line 4. The circuit 52 subtracts X from this number to produce a tentative or trial remainder which does not show up in FIG. 7*b.* However, these are in a column labeled IN-X in FIG. 9. As indicated above, the signs of IN-X and X must be identical in order for a logic 1 to appear at the (+) output lead 70 and thus in the quotient. As will be observed in FIG. 9, the signs of X, which is positive, and IN-X do not become the same until word time $N_4$. At this time a logic 1 is inserted in the fifth most significant position of the quotient and does not again occur. Referring to FIG. 10 and comparing it with FIG. 7*a*, it will be noted that in this instance the signs of X and IN-X are positive and thus the same for each occurrence except during word time $N_4$. Thus, all but one of the words after $N_1$ result in a logic 1 being inserted into the quotient.

The NAND gate 56 provides a logic 0 output to activate flip-flop 68 at the J input thereof at the termination of the sync bit if the most significant bits or sign bits of the two words applied to gate 56 are negative or a logic 1 and gate 58 provides the same action if both the IN-X word and the X word are positive or in other words incorporate a logic 0 in the most significant bit position.

Positive Limit Detection Circuit

FIG. 6

Figure 6:
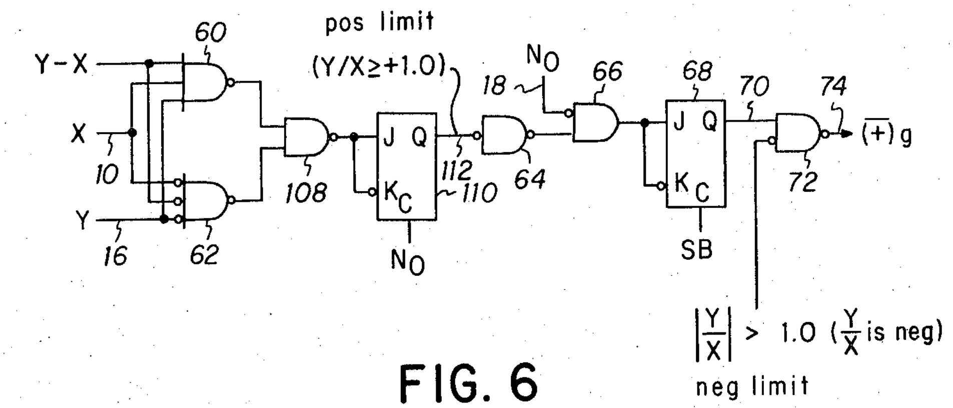

FIG. 6 provides a logic 1 output on lead 112 if the quotient is equal to or greater than +1 and causes all logic 1's to be inserted into the answer thereby indicating a positive limit.

If (1) Y is positive, X is positive and Y–X is negative, or (2) if Y and X are negative along with Y–X being positive, then the absolute value of X is greater than Y AND thus, Y divided by X will be less than +1.0.

If (1) X and Y are positive as well as (Y–X) being positive, or (2) if X and Y are negative as well as the difference of (Y–X) being negative, then the absolute value of X is less than the absolute value of Y and therefore the quotient of Y divided by X is equal to or greater than +1.0. FIG. 6 illustrates the circuitry for modifying the output to a positive limit if the answer is greater than the capability of the circuit.

The logic circuitry of the NAND gate 60, 62 and 108 combine to provide a logic 1 output under the conditions of the quotient being greater than +1.0. The flip-flop 110 will change to provide a logic 1 output at the commencement of word time $N_1$ and will stay at this logic output until the next $N_0$ pulse reacts with an indication that Y/X is less than +1.0 to reset the J-K flip-flop 110 to its initial condition.

When the logic circuitry comprising the NAND gates 60, 62 and 108 detect that the absolute value of Y is greater than the absolute value of X and they have the same sign, thereby making the quotient of Y divided by X equal to or greater than +1, a logic 1 appears at the J input of flip-flop 110 and since the next clock does not appear until word $N_0$, this flip-flop stays in this condition until the negative going portion of the $N_0$ word.

Although gate 64 has two other inputs as shown in FIG. 1, the application of a logic 1 at the inverted input thereof assures that a logic 1 will appear at the output and be supplied to AND gate 66. Since $N_0$ supplies a logic 1 only during that word period, the inversion thereof assures a logic 1 output from AND gate 66 from word times $N_1$ through $N_7$ if the absolute value of Y is greater than the absolute value of X. This maintains a logic 1 output from flip-flop 68. This logic 1 will be applied to NAND gate 72 and results in a logic 0 output on lead 74 since the input from the lead at the inverted input of NAND gate 72 must of necessity be logic 0 at this time. The answer appearing at lead 100 will thus be 11111110.

The circuits of FIGS. 2–6 are combined into the overall circuit of FIG. 1 which uses the same designators for each of the blocks.

As a brief summary of overall circuit operation, it will be noted that an input signal is applied at the appropriate input. Logic circuitry is then used to determine if the quotient applicable to the numbers would exceed either a positive 1 in the positive direction or a negative 1 in the negative direction and thus exceed the capacity of the circuit. If the quotient would be greater than positive 1, a logic 1 output is supplied by lead 112 and lead 70 to force lead 74 to a logic 0 thereby inserting all logic 1's in the output other than the initial and most significant bit which indicates that it exceeds the limit in the positive direction.

If the quotient would exceed the limit in the negative direction, a logic 1 appears on lead 26 to insert a logic 1 in the most significant or sign bit of the answer indicating that it is a negative number and then a logic 1 appears on lead 74 to prevent any further logic 1's from appearing in the output until the least significant bit at which time a logic 1 is added to the answer due to the appearance of logic 0 on lead 80.

If, on the other hand, the positive or negative limit is not exceeded, the circuitry acts to check the remainder against the divisor and perform a subtraction from that remainder by the amount of the divisor if the remainder is larger than the divisor. In accordance therewith, a logic 1 is placed in the answer. Regardless of whether or not a subtraction occurs, the remainder is doubled after each check until such time as the remainder does become larger than the divisor thereby providing a logic 1 to the answer at that particular bit position.

While I have described a particular embodiment of a divider circuit, I wish to be limited not by the embodiment shown but only by the scope of the claims, wherein I claim:

1. Serial digital word dividing apparatus operating to complete a division operation in the time necessary to clock a a frame of words wherein the number of words in a frame equals the number of bits in the divisor word comprising, in combination:

first and second input means for supplying LSB (least significant bit) first serial digital dividend and divisor words respectively;

apparatus output means for supplying LSB first serial digital quotient words;

first logic means, connected to said first and second input means, for comparing the sign bits of said dividend and divisor words and providing an output signal when the sign bits are not identical;

second logic means, connected to said first and second input means and to said first logic means, for adding said dividend and divisor words during the first word of a frame only if said first logic means supplies an output signal, for doubling a partial remainder obtained during each word of the frame, for comparing the partial remainder to the divisor, for subtracting the divisor word from the partial remainder if the partial remainder is larger and for supplying an output signal for each subtraction; and connection means connecting said first and second logic means to said apparatus output means for supplying a first logic output indicator to said apparatus output means when an output signal is received from either of said logic means and for supplying a second logic output indicator when no output signals are received from either of said logic means during a word of the frame.

2. Dividing apparatus as claimed in claim 1 comprising, in addition:

third logic means, connected to said first and second input means, said first and second logic means and said connection means, for supplying output signals to produce one of the logic output indicators when the quotient would exceed apparatus capacity and when an output is received from said first logic means during the same frame and to produce the other logic output indicator when the quotient would exceed apparatus capacity and no output signal is received from the first logic means during that frame.

3. Dividing apparatus as claimed in claim 2 wherein said third logic means includes:

means for supplying signals for providing logic zeros to said apparatus output means commencing with the second word when the capacity of the apparatus is exceeded in the negative direction; and further means for supplying an overriding signal for providing a logic one to said apparatus output means in the least significant bit position when the capacity of the apparatus is exceeded in the negative direction.

4. Dividing apparatus comprising, in combination:

multiplying means, including divisor serial digital word input means, control means and output means, for providing an output word indicative of a word supplied to the digital input thereof when a control signal is supplied to the control means thereof;

first summing means, including first and second input means and output means;

means connecting said output means of said multiplying means to said first input means of said first summing means;

first shift register means including input means and output means;

gating means, connected between said output means of said first summing means and said input means of said first shift register means, for passing all bits other than those occurring during the sign bit position time of the words in a frame;

second shift register means including input and output means;

second summing means, including first and second input means and output means, for providing a difference signal at said output means thereof of signals supplied to said input means thereof;

dividend means for supplying a dividend serial digital word signal;

switch means, connected to said input means of said second shift register means and to said first input means of second summing means, for normally supplying signals from said output means of said first shift register means and for alternatively periodically supplying dividend signals from said dividend means.

means connecting said output means of said second shift register means to said second input means of said first summing means;

first logic means, including first and second input means and output means, for providing a logic 1 output signal when the sign bits of words applied to said inputs thereof are identical;

divisor serial digital word signal supply means connected to said input means of said multiplying means and to said second input means of each of said second summing means and said logic means;

means connecting said output means of said second summing means to said first input means of said logic means; and means connecting said output means of said logic means to said control means of said multiplying means.

5. Apparatus as claimed in claim 4 comprising, in addition:

second logic means, connected to said output means of said second summing means, to said divisor means, to said dividend means and to said first logic means, for providing an output signal to said first logic means to force said first logic means to a logic 1 output when said second logic means receives input words from each of said second summing means and said divisor and said dividend means each word having identical sign bits thereby indicating that the quotient exceeds the apparatus capacity in the positive polarity direction.

6. Apparatus as claimed in claim 4 comprising, in addition:

second logic means, connected to said output means of said first summing means and to said divisor and to said dividend means, for providing output signals for inserting logic 0's in a quotient word appearing at an apparatus output means when the sign bits of the divisor and dividend words are different and when simultaneously the summation word representing the divisor and dividend words has the same sign as the dividend word, thereby indicating that the quotient exceeds the apparatus capacity in the negative polarity direction.

7. Apparatus as claimed in claim 4 comprising, in addition:

apparatus output means, connected to said first logic means, for supplying output quotient words;

second logic means, connected to said output means of said second summing means, to said divisor means, to said dividend means and to said first logic means, for providing an output signal to said first logic means to force said first logic means to a logic 1 output when said second logic means receives input words from each of said second summing means and said divisor and said dividend means each word having identical sign bits thereby indicating that the quotient exceeds the apparatus capacity in the positive polarity direction;

third logic means, connected to said output means of said first summing means and to said divisor and to said dividend means, for providing output signals for inserting logic 0's in the quotient word appearing at said apparatus output means when the sign bits of the divisor and dividend words are different and when simultaneously the summation word representing the divisor and dividend words has the same sign as the dividend word, thereby indicating that the quotient exceeds the apparatus capacity in the negative polarity direction; and fourth logic, connected to said third logic means, for inserting a logic 1 in the least significant bit position of the quotient word appearing at said apparatus output means when the quotient exceeds the apparatus capacity in the negative polarity direction.

* * * * *